United States Patent

[11] 3,617,377

[72] Inventors Setsuya Isshiki
Funabashi-shi;
Kaoru Saito, Tokyo; Hideo Sunazuka,
Tokyo, all of Japan
[21] Appl. No. 643,931
[22] Filed June 6, 1967
[45] Patented Nov. 2, 1971
[73] Assignee The Fujikura Cable Works Limited
Tokyo, Japan
[32] Priority June 10, 1966
[33] Japan
[31] 41/37403

[54] INSULATION CONSISTING OF ETHYLENE-PROPYLENE RUBBER COMPOSITION FOR ELECTRIC WIRE AND CABLE
2 Claims, 1 Drawing Fig.
[52] U.S. Cl. .................................................. 117/224,
117/226, 117/232
[51] Int. Cl. .................................................. H01b 3/30

[50] Field of Search............................................ 117/224,
232; 260/23 H, 27

[56] References Cited
UNITED STATES PATENTS
2,927,091 3/1960 Liggett ......................... 260/27
3,160,598 12/1964 Delfosse ....................... 260/23 H
3,362,924 1/1968 Eastman ....................... 117/232

Primary Examiner—William D. Martin
Assistant Examiner—Raymond M. Speer
Attorney—Wenderoth, Lind & Ponack ABSTRACT: Insulation material for electric wire and electric cable consisting of composition containing (a) ethylene-propylene rubber, (b) finely divided calcium carbonate surface-treated with hydrophobic fatty acid or its salt in amount of 10–80% by weight based on the ethylene-propylene rubber, and (c) heavy calcium carbonate in amount of 10–150% by weight based on the ethylene-propylene rubber and/or carbon black having particle size of at least 100 $\mu$ in amount of 1–80% by weight based on the ethylene-propylene rubber.

PATENTED NOV 2 1971 3,617,377
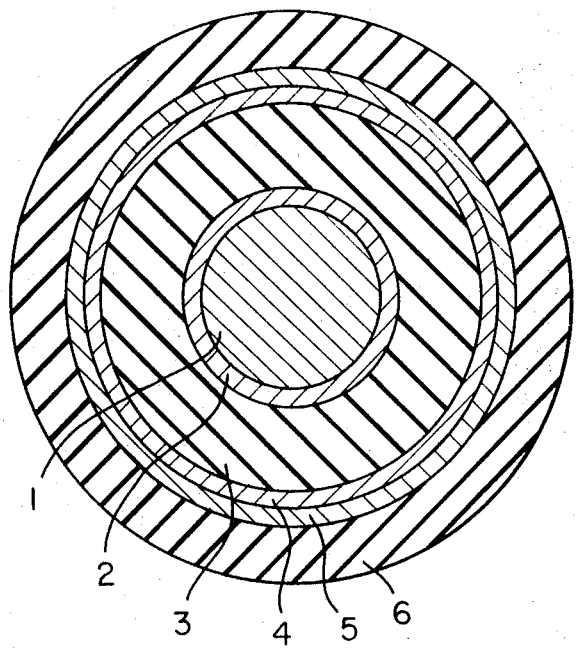
Setsuya Isshiki
Kaoru Saito and
Hideo Sunazuka,
INVENTORS
BY Wenderoth, Lind
and Ponack, Attorneys

INSULATION CONSISTING OF ETHYLENE-PROPYLENE RUBBER COMPOSITION FOR ELECTRIC WIRE AND CABLE

This invention relates to an insulation consisting of an ethylene-propylene rubber composition for wire and cable, wire and cable having a coating layer of said insulation and a process for the production thereof, particularly to an insulation material consisting of an ethylene-propylene rubber composition having preferable combination of excellent electric characteristics and mechanical properties.

Ethylene-propylene rubber, for instance, an ethylene-propylene copolymer or an ethylene-propylene terpolymer, is known as an insulation having very excellent electric characteristics per se and is broadly used as an insulating coating layer for electric power cable and other electric wire and cable.

Heretofore, a so-called EPR-insulated electric wire or cable having such ethylene-propylene rubber as an insulation has been obtained by sufficiently kneading a composition of ethylene-propylene rubber incorporating therein a filler such as clay, calcined clay or carbon black together with a vulcanizing agent and other compounding agent, thereafter coating the outside of a conductor with the compounded rubber composition by either the extrusion or the covering method, and vulcanizing the coating.

However, when a relatively large amount of said filler was mixed in ethylene-propylene rubber, the electric characteristics of the rubber composition remarkably lowered, while on the other hand, when the amount of the filler in ethylene-propylene rubber was limited to such amount as might not bring remarkable lowering of the electric characteristics, it has been unable to cause the mechanical strength of the insulating layer consisting of the rubber composition to reach a sufficiently satisfactory level. That is, a known EPR-insulated electric cable has not been satisfactory yet in combination of the electric characteristics and the mechanical strength of the insulating coating layer.

Further in the field of the electric cable industry, it is always desirable to increase the amount of the filler in the insulating layer as much as possible thereby reducing the production cost of the electric cables.

An object of this invention is to provide an insulation consisting of an ethylene-propylene rubber composition for electric wire and cable having preferable combination of excellent electric characteristics and mechanical properties and electric wire and cable having said insulation as a coating layer outside a conductor.

Another object of this invention is to provide an insulation material of an ethylene-propylene rubber composition capable of compounding a large amount of a filler without lowering the electric characteristics of the composition, accordingly, the cost for the production thereof is relatively inexpensive.

Other objects and advantages of this invention will become clear from the following description.

The aforesaid objects are achieved by an insulation material of a vulcanized ethylene-propylene rubber composition containing (a) ethylene-propylene rubber, (b) finely divided calcium carbonate surface treated by a hydrophobic fatty acid or its salt in an amount of 10–80 parts by weight based on 100 parts by weight of the ethylene-propylene rubber, and (c) at least one kind of filler selected from the group consisting of heavy calcium carbonate and carbon black whose particle size is at least 100 $\mu$, where in the case of said calcium carbonate, it exists in an amount of 10–150 parts by weight based on 100 parts by weight of the ethylene-propylene rubber, and in the case of said carbon black, it exists in an amount of 1–80 parts by weight based on 100 parts by weight of the ethylene-propylene rubber.

Ethylene-propylene rubber used in this invention is what is well known as ethylene-propylene copolymer and ethylene-propylene terpolymer with the characteristics of excellent electric properties, ozone resistance and toughness. In this invention, it is preferable to use an ethylene-propylene copolymer consisting of 20–80 percent of ethylene and 80–20 percent of propylene and an ethylene-propylene terpolymer consisting of 20–80 percent of ethylene, 80–20 percent of propylene and 0.1–10 percent of a diolefin such as hexadiene.

The important characteristics of this invention resides in, as will be mentioned in detail later, strict selection of the kind of filler compounded and strict definition of the adding amount of each filler.

A first filler used in this invention is calcium carbonate surface treated by a hydrophobic fatty acid or its salt.

Said hydrophobic fatty acid as referred to in this invention means a higher aliphatic carboxylic acid, preferably saturated and unsaturated higher aliphatic monocarboxylic acids. Of these fatty acids, rhodinic acid, palmitic acid, stearic acid and oleic acid are preferable for their ready availability. And as a salt of a hydrophobic fatty acid, a sodium salt, a potassium salt and a calcium salt may be used.

Calcium carbonate used may be either light calcium carbonate or heavy calcium carbonate, however, calcium carbonate whose particle size is below 200 $\mu$ after surface treated with and fatty acid or its salt is preferable from the viewpoint of electric insulation characteristics and weatherability of the ethylene-propylene rubber.

For treating the surface of calcium carbonate with said fatty acid or its salt, conventional means for forming a film on the surface of a solid may be adopted. For instance, finely divided heavy calcium carbonate is immersed in a molten solution or a nonmolten liquid solution or dispersion of calcium salt of a fatty acid. It is also possible to produce the coated calcium carbonate particles by mixing a fatty acid or its salt, for instance, sodium stearate, with lime milk ($Ca(OH)_2$) solution and blowing carbon dioxide gas through the mixture to form light calcium carbonate coated with calcium stearate. It is especially preferable that the calcium carbonate particles have the calcium salt of a fatty acid as the desirable film on the surface of said particles. The amount of a fatty acid or its salt to be coated on the surface of calcium carbonate is preferably 0.01–5.0 percent by weight based on calcium carbonate.

The surface-treated calcium carbonate has not only interface properties tending to uniformly disperse in ethylene-propylene rubber due to the surface treatment with a fatty acid or its salt, but also calcium carbonate surfaces treated with a fatty acid produced by the method of blowing carbon dioxide in lime milk containing a fatty acid such as, for instance, stearic acid produces a finely divided particle having a spherical configuration and a particle size of below 200 $\mu$ which is the preferable configuration for dispersing.

When electric characteristics of said surface-treated calcium carbonate used in this invention and fillers heretofore used as insulations for ethylene-propylene rubber are compared, they become as shown in the following table 1.

TABLE 1

Electric properties of fillers per se

| Filler | Tan.δ (%) | Volume Resistivity (Ω cm.) |
|---|---|---|
| Calcium carbonate surface treated with a fatty acid in this invention | 4.3 | $8.7 \times 10^{14}$ |
| Clay | Above 10 | $1.1 \times 10^{12}$ |
| Diatomaceous earth | Above 10 | $1.5 \times 10^{11}$ |
| Talc | Above 10 | $5.6 \times 10^{12}$ |
| Light calcium carbonate | Above 10 | $1.0 \times 10^{11}$ |
| Heavy calcium carbonate | Above 10 | $2.3 \times 10^{11}$ |
| Water-containing silicic acid | Above 10 | $1.0 \times 10^{11}$ |
| Carbon black having a particle size of 100 $\mu$ | Above 10 | $9.0 \times 10^{14}$ |
| Magnesium carbonate | Above 10 | $5.0 \times 10^{10}$ |

From above table 1, its is understood that volume resistivities of these fillers are considerably inferior as compared with volume resistivity of ethylene-propylene rubber per se of $1.0 \times 10^{17}$ Ω cm., however, the surface-treated calcium carbonate in this invention is remarkably excellent in volume resistivity and tan. δ as compared with the filler such as clay and talc, especially as compared with nontreated light calcium carbonate the volume resistivity is more than 1,000 times.

Next, these fillers are compounded with ethylene-propylene rubber with other compounding agents at a ratio shown below, and electric characteristics of said rubber compound vulcanized at 150° C. for 40 minutes are shown by values of tan.δ (percent) in table 2 and mechanical strengths are shown by tensile strength (kg./mm.²) in table 3.

Compounding Ratio (part by weight)

| | |
|---|---|
| Ethylene-propylene copolymer | 100 |
| Zinc oxide | 5 |
| Paraffin | 1 |
| Filler | Amounts shown in tables 2 and 3 |
| Dicumyl peroxide | 3 |
| Sulfur | 2 |

TABLE 2

Tan. δ of ethylene-propylene rubber composition

| Kind of filler | Compounding amount | | | | | |
|---|---|---|---|---|---|---|
| | 0 | 20 | 50 | 70 | 100 | 150 |
| Calcium carbonate surface treated with a fatty acid in this invention | 0.5 | 0.5 | 0.5 | 0.7 | 1.9 | 3.4 |
| Clay | 0.5 | 1.8 | 2.9 | 3.3 | 4.4 | 5.1 |
| Talc | 0.5 | 0.9 | 1.2 | 1.6 | 2.2 | 3.2 |
| Heavy calcium carbonate | 0.5 | 0.5 | 0.5 | 0.55 | 0.7 | 1.0 |
| Carbon black having a particle size of at least 100 μ | 0.5 | 0.5 | 0.6 | 1.0 | 2.4 | 4.0 |
| Diatomaceous earth | 0.5 | 1.0 | 1.7 | 2.1 | 2.9 | 3.8 |
| Magnesium carbonate | 0.5 | 1.9 | 3.1 | 4.0 | 5.2 | 3.9 |

TABLE 3

Tensile strength of ethylene-propylene rubber composition (kg./mm.²)

| Kind of filler | Compounding amount (part by weight) | | | | | |
|---|---|---|---|---|---|---|
| | 0 | 20 | 50 | 70 | 100 | 150 |
| Talc | 0.20 | 0.56 | 0.94 | 0.96 | 1.03 | 1.00 |
| Clay | 0.20 | 0.40 | 0.48 | 0.51 | 0.56 | 0.54 |
| Surface-treated CaCO₃ | 0.20 | 0.56 | 0.84 | 0.85 | 0.90 | 0.92 |
| Surface-treated clay | 0.20 | 0.35 | 0.38 | 0.40 | 0.42 | 0.42 |
| Heavy calcium carbonate | 0.20 | 0.30 | 0.34 | 0.31 | 0.40 | 0.38 |
| Carbon black having a particle size of 100 mμ | 0.20 | 0.40 | 0.60 | 0.58 | 0.62 | 0.65 |
| Diatomaceous earth | 0.20 | 0.40 | 0.50 | 0.52 | 0.54 | 0.54 |
| Magnesium carbonate | 0.20 | 0.31 | 0.38 | 0.38 | 0.40 | 0.40 |

The present inventors have found that when the value of tan.δ of ethylene-propylene rubber composition is limited to a value lower than 1 percent, an insulation material consisting of such ethylene-propylene rubber composition is sufficiently satisfactory as wire and cable insulation. Thus, from said table 2 and table 3, it is understood that by compounding 10–80 parts, preferable 40–70 parts by weight based on 100 parts by weight of the ethylene-propylene rubber of said surface-treated calcium carbonate in said rubber, it is possible to remarkably improve the mechanical strength without lowering the electric characteristics of the vulcanized rubber composition. Namely, when the compounding amount exceeds 80 parts by weight, as shown in said table 2 the electric characteristics, for instance, a value of dielectric loss tangent (tanδ) becomes worse, on the other hand, when the compounding amount of said surface-treated calcium carbonate is less than 10 parts by weight, an insulation having the desired mechanical strength cannot be obtained and the object of reducing the cost of an insulation by compounding of a filler cannot be achieved.

A second filler used in this invention is heavy calcium carbonate and/or carbon black having an average particle size of at least 100 μ. Heavy calcium carbonate used in this invention is well known as heavy calcium carbonate or natural whiting, and generally it is preferable to use what has specific gravity of 2.66–2.77 and an average particle size of 0.01–10 μ.

On the other hand, carbon black usable in this invention is that having an average particle size of at least 100 μ, especially preferably an average particle size within the range of 100–200 μ. Thus, in this invention carbon black produced by a furnace process such as fine thermal (F.T) and semireinforcing furnace (S.R.F.) can be used.

Use of a carbon black such as channel black whose range of particle size is in colloidal range is undesirable because such use results in reducing the volume resistivity of an insulating layer consisting of the ethylene-propylene rubber composition.

The compounding amount of a second filler of said group used in the process of this application varies according to the kind of filler, however, as shown in said table 2 such amount as may not cause tan.δ of the ethylene-propylene rubber composition to exceed 1 percent is used.

In the case of using heavy calcium carbonate, it is compounded in an amount of 10–150 parts, preferably 10–50 parts by weight based on 100 parts by weight of the ethylene-propylene rubber, on the other hand, when carbon black is used it is compounded in an amount of 1–80 parts, preferably 5–30 parts by weight based on 100 parts by weight of said rubber. The compounding amounts of these fillers do not normally have to be changed even when the two fillers are used concurrently.

Thus, calcium carbonate surface treated by a fatty acid or its salt, heavy calcium carbonate and/or carbon black are compounded in ethylene-propylene rubber in accordance with conventional method together with a cross-linking agent, vulcanization accelerator, softener and aging resistor.

In the case of an ethylene-propylene copolymer, as a known cross-linking agent peroxide such as for instance, dicumyl peroxide, benzoyl peroxide and tert-butyl benzoyl peroxide is employed and as a vulcanization accelerator, quinone dioxime, dibenzoyl quinone dioxime and diaryl phthalate are employed.

In the case of an ethylene-propylene terpolymer, a cross-linking agent such as peroxide, sulfur, quinone dioxime and thiurum type cross-linking agent; a vulcanization accelerator such as quinone dioxime, benzoylquinone dioxime and thiurum type vulcanization accelerator; a softener such as naphthene-, paraffin- and aromatic-type hydrocarbon; and an aging resistor such as 4,4'-thiobis- (6-tert-butyl-3-methyl) phenol and polymerized trimethyl dihydroquinoline are respectively employed and when desired other compounding agents such as color pigment may be employed.

As the compounding method, a method of mixing a filler in ordinary rubber may be adopted, namely, by using a known apparatus such as rolls or Bumbury's mixer kneading operations may be carried out.

The compounded rubber having finished kneading operations is coated on the outside of a conductor by the extrusion method or the covering method thereafter the coating of said rubber is pressingly wound with a cotton tape and vulcanized according to the conventional process. The conditions of the vulcanization vary depending upon the vulcanizing agent and the vulcanization accelerator used, however, generally the vulcanization may be easily carried out by heating the compounded composition at 130° – 200° C. for 1 minute to 3 hours.

In this case, it is normal to coat the rubber composition immediately above a conductor in the case of a small capacity wire and cable, and to coat the rubber composition via a semiconductive layer such as carbon paper or semiconductive rubber in the case of a large capacity cable.

Thus, the insulated electric wire of this invention is usable per se for various uses. The insulated-core wire so obtained is usually provided on its exterior with a protective covering for example polyvinyl chloride, chloroprene or lead sheathing, directly in the case of a single core cable, but after twisting together with other interposing materials in the case of a multicore cable. In the case of large-capacity cables, the foregoing protective covering is provided to the exterior of the cable, which has a metallic shielding tape, e.g. of copper or brass, applied about each individual insulated core wire or about an assembly of core wires which have been twisted together.

The FIGURE is a sectional view showing sectional structure of one embodiment of the ethylene-propylene rubber-coated electric cable, namely, a high-voltage single conductor cable.

In the FIGURE 1 is a conductor, 2 is a semiconductive layer, 3 is an insulating layer of ethylene-propylene rubber compounded with calcium carbonate surface treated by a hydrophobic fatty acid, and heavy calcium carbonate and/or carbon black, 4 is a semiconductive layer, 5 is a shield tape layer and 6 is a polychloroprene sheath. This invention covers not only a case wherein the insulating layer 3 in a power cable consists of a single layer of said ethylene-propylene rubber composition only, but also a case wherein said layer 3 consists of a composite insulating layer of a layer of said ethylene-propylene rubber composition and a layer of another synthetic rubber composition. In the case of the latter, insulation become graded insulation, becoming an electrically excellent structure.

The ethylene-propylene rubber composition compounded with surface-treated calcium carbonate, and heavy calcium carbonate and/or carbon black as fillers at specific volume ratio is remarkably excellent in combination of electric characteristics and mechanical strength as compared with a known ethylene-propylene rubber composition compounded with as fillers calcined clay, talc, clay, calcium carbonate and magnesium carbonate.

Heretofore it has been known to compound ethylene-propylene rubber with various fillers as insulation material for electric wire and cable, however, the filler capable of improving mechanical strength of an ethylene-propylene rubber composition normally has been tending to lower the electric characteristics of the insulation material and a filler satisfying both the mechanical strengths and the electrical properties of an ethylene-propylene rubber composition has not been found.

Whereas, the present inventors have found that by selecting calcium carbonate surface treated with a hydrophobic fatty acid or its salt excellent in electric characteristics as a filler per se as compared with other conventional fillers, at the same time, showing excellent mechanical strengths when compounded in rubber, compounding the same with one or both of heavy calcium carbonate or carbon black having a particle size of at least 100 $\mu$, and defining the amounts of these fillers such that when each of these fillers is singly compounded in rubber, the value of tan.$\delta$ may not exceed 1 percent, the obtained insulation material consisting of an ethylene-propylene rubber composition has combination of excellent electric characteristics represented as shown in undermentioned examples by tan.$\delta$ smaller than 1 percent and excellent mechanical strengths.

It is heretofore accepted common sense that when content of a filler in rubber is increased, the electric characteristics of the rubber composition lowers as the compounding amount increases. Therefore, it is anticipated that use of at least two fillers would, as the total amount of these fillers increases result in proportional lowering of the electric characteristics of the rubber compound. Whereas, unexpectedly in this invention despite use of two or three kinds of filler, by making the compounding amount of each of said fillers such that when each of said fillers is singly compounded in rubber the value of tan.$\delta$ may not exceed 1 percent, an ethylene-propylene rubber composition compounding two or three kinds of filler therein is maintained in such a range that value of tan.$\delta$ may not exceed 1 percent.

Further, the ethylene-propylene rubber composition of this invention besides having said preferable combination of electric characteristics and mechanical strengths, due to use of said surface-treated calcium carbonate, has an advantage that lowering of electric characteristics even when exposed under hydroscopic conditions for a long period is little. Further, when in accordance with this invention, carbon black whose average particle size is at least 100 $\mu$ is used concurrently in an amount within the range of 1–80 parts by weight, there is an advantage that weatherability of the insulating layer is improved, further, imparting tracking resistance thereto without lowering dielectric strength.

This invention will be explained by the following example.

EXAMPLE 1

In ethylene-propylene rubber (consisting of 50 mols of ethylene and 50 mols of propylene, degree of polymerization: 150,000, trade name: Dutral), together with the undermentioned compounding agents, light calcium carbonate having a coating of calcium stearate and heavy calcium carbonate were compounded in various amounts shown in table 4 for 0.3 hours by rollers. The compounded rubbers were formed into sheets 1 mm. thick and 20 cm. × 20 cm. dimension by using a press, followed by subjecting these sheets to steam vulcanization at 150° C. for 40 minutes. The electric and physical characteristics of these vulcanized rubbers were as follows.

Compounding Ratio (parts by weight)

| | |
|---|---|
| Ethylene-propylene rubber | 100 |
| Zinc oxide | 5 |
| Paraffine | 1 |
| Surface-treated light calcium carbonate | Amounts shown in table 4 below |
| Dicumyl peroxide | 3 |
| Quinone dioxime | 2 |
| Heavy calcium carbonate | Amounts shown in table 4 below |

TABLE 4

| Item | Prescription | | | |
|---|---|---|---|---|
| | A | B | C | D |
| Compounding amount: | | | | |
| Surface-treated light calcium carbonate | 80 | 80 | 80 | 100 |
| Heavy calcium carbonate | 100 | 150 | 200 | 50 |
| Electric characteristics: | | | | |
| Tan. $\delta$ (percent) room temp. | 0.60 | 1.00 | 2.20 | 1.90 |
| Volume resistivity ($\Omega$cm.) | 7.1×10$^{15}$ | 5×10$^{15}$ | 9×10$^{14}$ | 2×10$^{13}$ |
| (K./mm.) dielectric strength | 35 | 30 | 28 | 31 |
| Physical characteristics: | | | | |
| Tensile strength (kg./mm.$^2$) | 0.81 | 0.78 | 0.62 | 0.83 |
| Elongation (percent) | 750 | 700 | 580 | 900 |

For information, in the above example when instead of calcium carbonate surface treated with stearic acid, calcium carbonate surface treated with rhodinic acid, calcium carbonate surface treated with palmitic acid and calcium carbonate surface treated with oleic acid were used, the similar results were obtained.

From the results of above table 4, it is understood that by maintaining the respective compounding amounts of surface-treated calcium carbonate and heavy calcium carbonate such that when each of these calcium carbonates is singly compounded, value of tan.$\delta$ may not exceed 1 percent (Prescriptions A and B), it is possible to improve the mechanical strengths of the insulation material and maintain value of tan.$\delta$ less than 1 percent, on the other hand by the prescriptions outside the range of this invention (Prescriptions C and D), lowering of the electric characteristics is remarkable.

EXAMPLE 2

To ethylene-propylene rubber (consisting of 50 mols of ethylene and 50 mols of propylene, degree of polymerization: 150,000, trade name: Dutral), besides the undermentioned compounding agents, light calcium carbonate having a coating of calcium rosinate and carbon black (fine thermal) whose average particle size being at least 100 $\mu$ were added in various amounts shown in table 5 below and compounded in mixing rolls for 0.3 hour. Using press, these compounded rubbers were formed into sheets 1 mm. thick and 20 cm. × 20 cm. dimension, subsequently the sheets were subjected to steam vulcanization at 150° C. for 40 minutes. The electric and physical characteristics of this vulcanized rubbers were as follows.

Compounding Ratio (parts by weight)

| | |
|---|---|
| Ethylene-propylene rubber | 100 |
| Zinc oxide | 5 |
| Paraffin | 1 |
| Carbon black whose average particle size is at least 100 m$\mu$ | Amounts shown in table 5 below |
| Surface-treated calcium carbonate | Amounts shown in table 5 below |
| Dicumyl peroxide | 3 |
| Benzoyl quinone dioxime | 2 |

TABLE 5

| Item | Prescription | | | | |
|---|---|---|---|---|---|
| | E | F | G | H | I |
| Compounding amount: | | | | | |
| Carbon black having a particle size of 100 m$\mu$ | 80 | 80 | 90 | 100 | 100 |
| Surface-treated light CaCO$_3$ | 40 | 80 | 100 | 80 | 100 |
| Electric characteristics: | | | | | |
| Tan. $\delta$ (percent) room temp | 0.98 | 0.95 | 2.20 | 2.30 | 2.50 |
| Volume resistivity ($\Omega$cm.) at room temp. | 7×10$^{15}$ | 7.2×10$^{15}$ | 1.8×10$^{15}$ | 2×10$^{15}$ | 1×10$^{15}$ |
| (Kv./mm.) dielectric strength | 35 | 36 | 28 | 19 | 18 |
| Physical characteristics: | | | | | |
| Tensile strength (kg./mm.$^2$) | 0.75 | 0.82 | 0.90 | 0.85 | 0.89 |
| Elongation (percent) | 950 | 900 | 880 | 750 | 680 |

From the results of above table 5 it is apparent that by maintaining the respective compounding amounts of surface-treated calcium carbonate and carbon black such that when each of them is singly compounded, value of tan.$\delta$ may not exceed 1 percent (prescription E and F), it is possible to improve the physical strengths of the insulation materials and maintain values of tan.$\delta$ below 1 percent. On the other hand, in the cases of the rubber compounds whose compounding amounts of fillers are outside the range of this invention (prescriptions G, H and I), lowering of the electric characteristics is observed.

EXAMPLE 3

To ethylene-propylene rubber (consisting of 50 mols of ethylene and 50 mols of propylene, degree of polymerization: 150,001, trade name: Dutral), besides the undermentioned compounding agents, light calcium carbonate having a coating of calcium oleate, heavy calcium carbonate and carbon black (medium thermal) having an average particle size of at least 100 $\mu$ were added in amounts shown in table 6 below and compounded in mixing rolls for 0.3 hour. The compounded rubbers were formed into sheets of 1 mm. thick and 20 cm. × 20 dimension using a press, subsequently the sheets were subjected to steam vulcanization at 150° C. for 40 minutes. The electric characteristics and physical characteristics of these vulcanized rubbers were shown in table 6 below.

Compounding Ratio (parts by weight)

| | |
|---|---|
| Ethylene-propylene rubber | 100 |
| Zinc oxide | 5 |
| Paraffin | 1 |
| Heavy calcium carbonate | Amounts as shown in table 6 below |
| Surface-treated light calcium carbonate | Amounts as shown in table 6 below |
| Carbon black having a particle size of 100 m$\mu$ | Amounts as shown in table 6 below |
| Dicumyl peroxide | 3 |
| Sulfur | 2 |

TABLE 6

| Item | Prescription | J | K | L | M | N | O |
|---|---|---|---|---|---|---|---|
| Compounding amount | Surface-treated light calcium carbonate | 80 | 100 | 40 | 40 | 40 | 50 |
| | Heavy calcium carbonate | 40 | 40 | 50 | 50 | 150 | 160 |
| | Carbon black having particle size of 100 m$\mu$ | 50 | 50 | 50 | 100 | 10 | 50 |
| Electric characteristics | Tan. $\delta$ (percent) room temp | 0.81 | 2.05 | 0.65 | 2.50 | 0.98 | 1.50 |
| | Volume resistivity ($\Omega$ cm.) room temp | 6×10$^{15}$ | 1×10$^{15}$ | 8.5×10$^{15}$ | 0.9×10$^{15}$ | 3×10$^{15}$ | 2.5×10$^{15}$ |
| | Dielectric strength (kv./mm.) | 30 | 28 | 33 | 24 | 31 | 28 |
| Physical characteristics | Tensile strength (kg./mm.$^2$) | 0.85 | 0.90 | 0.80 | 0.78 | 0.75 | 0.70 |
| | Elongation (percent) | 750 | 780 | 900 | 750 | 700 | 600 |

From the results of above table 6, it is apparent that when three kinds of compounding agent of surface-treated calcium carbonate, heavy calcium carbonate and carbon black are compounded by maintaining the compounding amounts of the respective compounding agents such that when each of said compounding agents is singly compounded, value of tan.$\delta$ may not exceed 1 percent (prescriptions J. L and N), it is possible to improve the physical strengths of the insulation materials and maintain value of tan.$\delta$ below 1 percent. On the other hand, the rubber compounds wherein the compounding amount of each compounding agent is outside the range of this invention (prescriptions K, M and O), considerable lowering of the electric characteristics is observed.

From the aforementioned results, it is understood that the ethylene-propylene rubber composition of this invention wherein the amount of each filler is limited to the specific range (prescriptions A, B, E, F, J, L and N) has preferable combination of electric characteristics and physical strengths as an insulation material as compared with the compositions whose amount of each filler is outside the range of this invention.

We claim:

1. An ethylene-propylene rubber insulated electric wire or cable which comprises an electric wire or cable coated with insulating layer composed of an ethylene-propylene rubber composition consisting essentially of (a) an ethylene-propylene rubber; (b) 10–80 parts by weight, based on 100 parts by weight of the ethylene-propylene rubber, of surface-coated finely divided calcium carbonate obtained by preparing a mixture of lime milk, and a monovalent higher fatty acid or a sodium, potassium or calcium salt thereof and blowing carbon dioxide gas into said mixture, the amount of the surface coating being 0.01–5.0 percent by weight based on the calcium carbonate; and (c) at least one filler selected from the group consisting of heavy calcium carbonate having a specific gravity of 2.66–2.77 and an average particle size of 0.01–10 $\mu$ and mixtures thereof with carbon black having a particle size of at least 100 $\mu$, said heavy calcium carbonate being employed in an amount of 10–150 parts by weight based on 100 parts by weight of the ethylene-propylene rubber and said carbon black being employed in an amount of 1–80 parts by weight based on 100 parts by weight of the ethylene-propylene rubber.

2. A process for the production of an ethylene-propylene rubber insulated electric wire or cable which comprises coating a conductor or a conductor having a semiconductive layer thereon with an ethylene-propylene rubber composition consisting essentially of (a) an ethylene-propylene rubber, (b) 10–80 parts by weight, based on 100 parts by weight of the ethylene-propylene rubber, of surface-coated, finely divided calcium carbonate obtained by preparing a mixture of lime milk and a monovalent higher fatty acid or a sodium, potassium or calcium salt thereof and blowing carbon dioxide gas into said mixture, the amount of the surface coating being 0.01–5 percent by weight based on the calcium carbonate, (c) a vulcanizing agent, (d) a vulcanizing accelerator and (e) at least one filler selected from the group consisting of heavy calcium carbonate having a specific gravity of 2.66–2.77 and an average particle size of 0.01–10 $\mu$ and mixtures thereof with carbon black having a particle size of at least 100 $\mu$, said heavy calcium carbonate being employed in an amount of 10–150 parts by weight based on 100 parts by weight of the ethylene-propylene rubber, said carbon black being employed in an amount of 1–80 parts by weight based on 100 parts by weight of the ethylene-propylene rubber, and then vulcanizing the coated rubber composition.

* * * * *